United States Patent [19]

Gasser et al.

[11] Patent Number: 5,224,163
[45] Date of Patent: Jun. 29, 1993

[54] METHOD FOR DELEGATING AUTHORIZATION FROM ONE ENTITY TO ANOTHER THROUGH THE USE OF SESSION ENCRYPTION KEYS

[75] Inventors: Morrie Gasser, Saugus; Andrew C. Goldstein, Hudson; Charles W. Kaufman, Northborough; Butler W. Lampson, Cambridge, all of Mass.

[73] Assignee: Digital Equipment Corporation, Maynard, Mass.

[21] Appl. No.: 589,925

[22] Filed: Sep. 28, 1990

[51] Int. Cl.⁵ .................... H04L 9/30; H04L 9/32
[52] U.S. Cl. ........................ 380/30; 380/23; 380/25; 380/49; 340/825.31; 340/825.34
[58] Field of Search ................. 380/23-25, 380/3, 4, 30, 49, 50, 21, 43; 364/222.5, 240.8, 246.6, 246.9, 283.3, 286.4, 286.5, 709.05, 958.1, 969.4; 340/825.31, 825.34

[56] References Cited

U.S. PATENT DOCUMENTS

| | | |
|---|---|---|
| 4,309,569 | 1/1982 | Merkle . |
| 4,405,829 | 9/1983 | Rivest et al. . |
| 4,771,459 | 9/1988 | Jansen . |
| 4,771,461 | 9/1988 | Matyas ........................ 380/24 |
| 4,779,224 | 10/1988 | Moseley et al. . |
| 4,868,877 | 9/1989 | Fischer ........................ 380/30 X |
| 4,887,077 | 12/1989 | Irby, III et al. . |
| 4,888,801 | 12/1989 | Foster et al. ............... 380/21 |
| 5,001,752 | 3/1991 | Fischer ........................ 380/23 |
| 5,003,593 | 3/1991 | Mihm, Jr. ..................... 380/21 |

OTHER PUBLICATIONS

Schroeder, Birrell & Needham, Experience with Grapevine: The Growth of a Distributed System, 2 ACM Transactions on Computer Systems 3-23 (1984).
Miller, Neuman, Schiller & Saltzer, Kerberos Authentication and Authorization System, Project Athena Technical Plan (1987).
European Community Manufactures Assocaition (ECMA), Security in Open Systems-Data Elements and Service Definitions: "Alice in Wonderland" (Jul. 1989).
ECMA, Security in Open Systems-A Security Framework, ECMA TR/46 (1988).
The Digital Distributed System Security Architecture, (1989).

Primary Examiner—Bernarr E. Gregory
Attorney, Agent, or Firm—Arnold, White & Durkee

[57] ABSTRACT

A method for delegating authorization from one entity in a distributed computing system to another for a computing session is disclosed wherein a session public/private encryption key pair is utilized for each computing session. The private encryption key is erased to terminate the computing session.

15 Claims, 9 Drawing Sheets

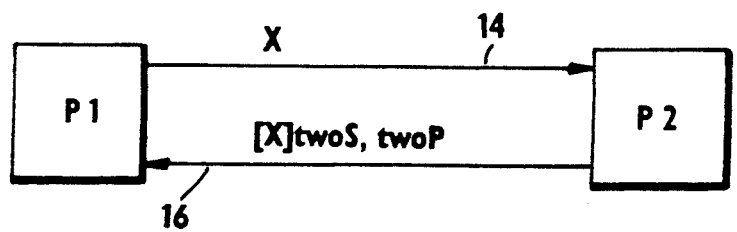
Fig. 1A
Fig. 1B
DOES  X = ( [X] twoS ) twoP
YES → P2  HAS KNOWLEDGE OF two S
NO → P2  DOES NOT HAVE KNOWLEDGE OF two S
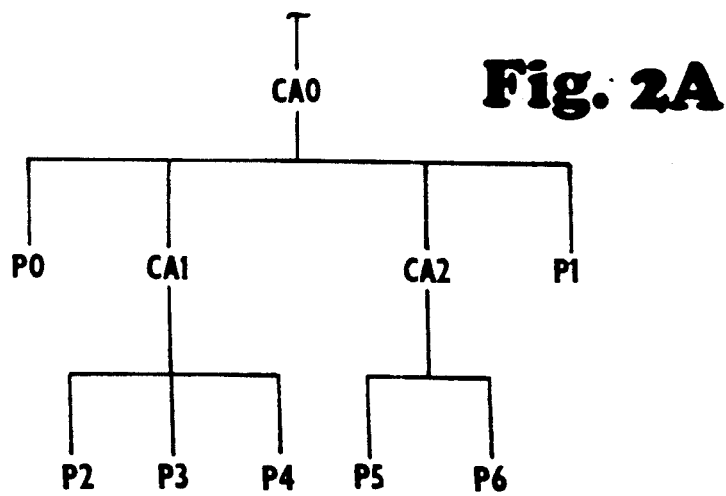
Fig. 2A
Fig. 2B
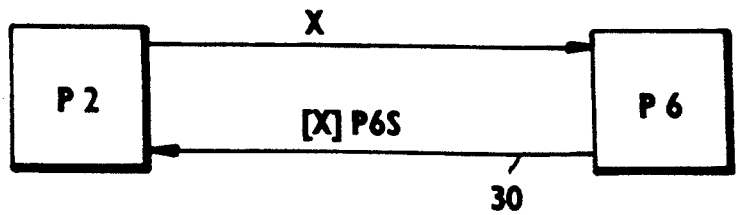

Fig. 3

FRED

31 → [FRED IS ASSOCIATED WITH PUBLIC KEY FRED P] CAS

32 → FRED IS A MEMBER OF GROUP S BY VIRTUE OF HIS MEMBERSHIP IN O

33 → FRED IS A MEMBER OF GROUP C BY VIRTUE OF HIS MEMBERSHIP IN O

34 → FRED IS A MEMBER OF GROUP B BY VIRTUE OF HIS MEMBERSHIP IN O

35 → FRED IS A MEMBER OF GROUP F BY VIRTUE OF HIS MEMBERSHIP IN O

36 → FRED IS A MEMBER OF GROUP W BY VIRTUE OF HIS MEMBERSHIP IN O

54 → D1=[W1 FOR P] SCS

54 → D1= [W1 FOR P] SCS
56 → D2=[W2 FOR P] W1S

D1'=[W1 DEL P AS W1 FOR P] SCS

D2'=[W2 DEL P AS W2 FOR P] W1 DEL S

ACL ::= ACCESS-RIGHT-EXPRESSION
        ACCESS-RIGHT-EXPRESSION AND ACL

ACCESS-RIGHT-EXPRESSION ::=
    80 → PRINCIPAL-SET  ⇒  ACCESS-RIGHT ← 81
         PRINCIPAL-SET  >  ACCESS-RIGHT ← 81'
    82 → PRINCIPAL-SET

ACCESS-RIGHT ::= READ | WRITE | ...

PRINCIPAL-SET ::=
    NAME
    (ACCESS-RIGHT-EXPRESSION)
    PRINCIPAL-SET  AND  PRINCIPAL-SET
    PRINCIPAL-SET  OR   PRINCIPAL-SET
    PRINCIPAL-SET  -    NAME
    PRINCIPAL-SET  -    C(NAME)

OPERATOR PRECEDENCE:

1. -
2. OR
3. AND
4. >
5. ⇒

Fig. 10

Fig. 13A
STUDENTS
TOM AND ALICE AND MARY AND BOB ⇒ READ
TOM AND ALICE ⇒ WRITE
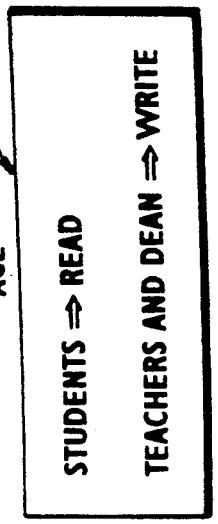
Fig. 13B
ACL  85
STUDENTS ⇒ READ
TEACHERS AND DEAN ⇒ WRITE
Fig. 11
BOB AND CAROL AND ONE ⇒ S
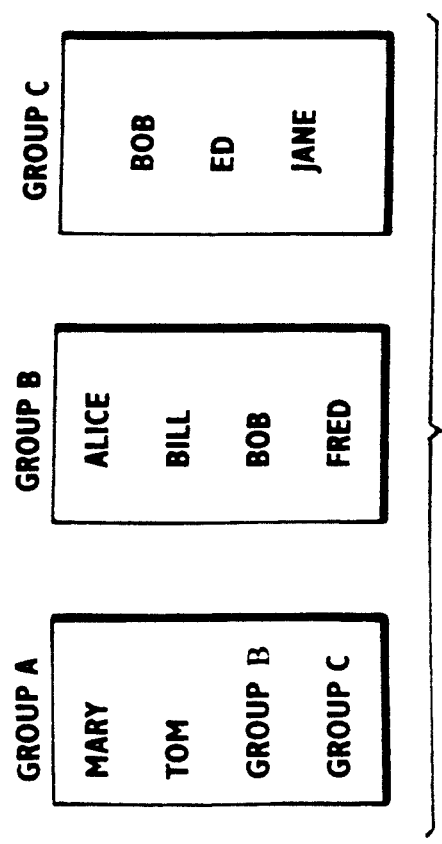
Fig. 12
GROUP A: MARY, TOM, GROUP B, GROUP C
GROUP B: ALICE, BILL, BOB, FRED
GROUP C: BOB, ED, JANE

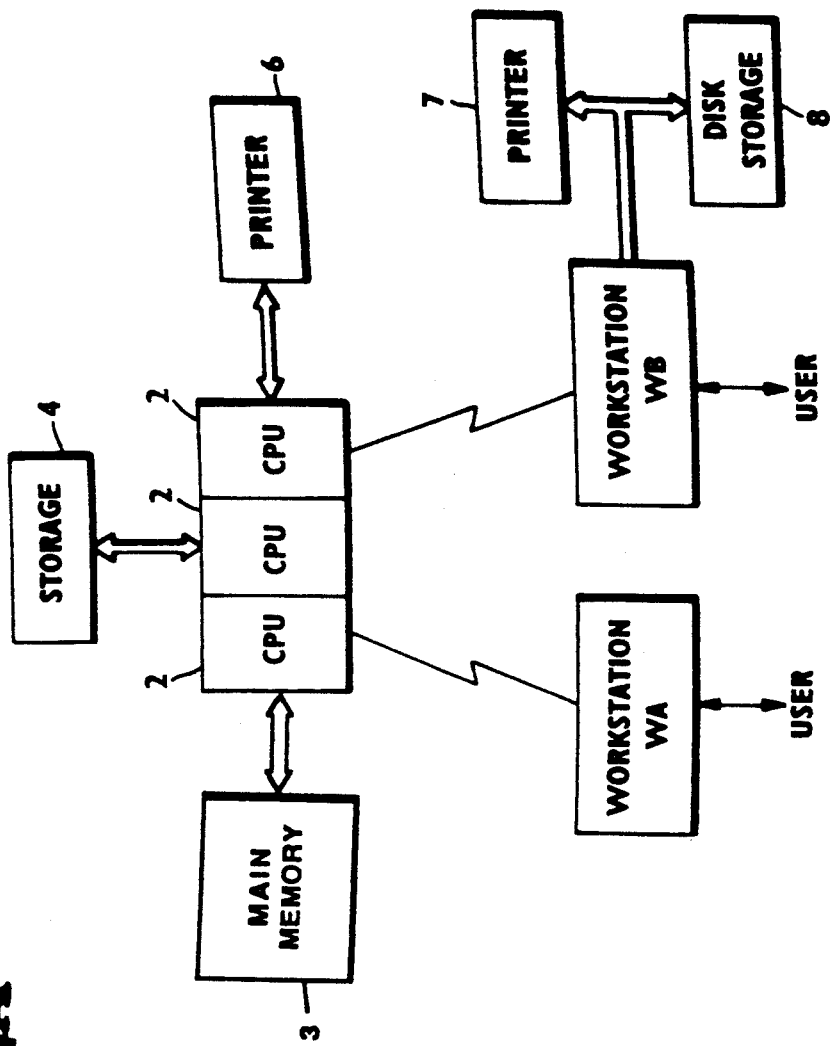
Fig. 15
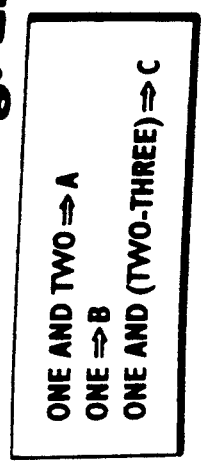
Fig. 14A
ONE AND TWO ⇒ A
ONE ⇒ B
ONE AND (TWO-THREE) ⇒ C
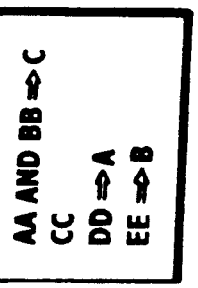
Fig. 14B
ONE
AA AND BB ⇒ C
CC
DD ⇒ A
EE ⇒ B
Fig. 14C
AA ⇒ C
BB ⇒ C
CC ⇒ A, B, C
DD ⇒ A
EE ⇒ B

METHOD FOR DELEGATING AUTHORIZATION FROM ONE ENTITY TO ANOTHER THROUGH THE USE OF SESSION ENCRYPTION KEYS

CROSS REFERENCE TO RELATED APPLICATIONS

This application is one of four filed simultaneously with essentially identical specifications including: U.S. Ser. No. 589,923 by Abadi, Goldstein, & Lampson, "COMPOUND PRINCIPALS IN ACCESS CONTROL LISTS" (DIGU:035 PD90-0349/03); U.S. Ser. No. 589,924 by Gasser, Goldstein & Kaufman, "A METHOD FOR PERFORMING GROUP EXCLUSION IN LARGE HIERARCHICAL GROUP STRUCTURES"(DIGU:034 PD90-0348/03); U.S. Ser. No. 589,925 by Gasser, Goldstein, Kaufman, & Lampson, "DELEGATION TO SESSION KEY" (DIGU:033 PD90-0347/03); U.S. Ser. No. 589,926 by Gasser, Goldstein, & Kaufman, "FAST MEMBERSHIP VERIFICATION IN LARGE HIERARCHIAL GROUPS" (DIGU:032 PD90-0345/03).

1. BACKGROUND OF THE INVENTION

1.1. Time Sharing Systems

In most large computing systems a timesharing computing environment is implemented. As illustrated in FIG. 15, such a system may include "resources" such as one or more central processing units (CPUs) 2 configured to share components such as main memory 3, disk or tape storage 4, and a printer 6. The system may also include user terminals such as workstations WA and WB, which in many implementations may have their own local resources such as one or more CPUs and associated main memory (not shown) as well as perhaps a printer 7 and disk storage 8. The CPU(s) 2 execute program sequences that cause the CPUs to process commands and requests transmitted by users from the workstations WA and WB in accordance with known timesharing methods.

In such an environment, the system resources are centrally managed by a trusted authority. Because the central authority controls all access to the system resources, it is often fully trusted. In other words, the central authority is designed and maintained to ensure that the security plan for the timesharing system is properly implemented. In such timesharing environments, when a "principal" on the system (e.g., a user) requests access to a system "resource" (e.g., a printer or file server) the central trusted authority determines whether the principal possesses the necessary security attributes to access the resource. If so, the trusted authority allows the access.

In these timesharing computer systems and the like, almost all access control is handled by the central trusted authority. As such, the trustworthiness of the central authority must be maintained. Because of the importance in having a trusted central authority, many prior art devices have emphasized the importance of having a single, trusted controlling authority.

1.2. Distributed Systems

In contrast to timesharing environments, there also exist "distributed systems." In distributed systems several separate computer systems are linked together in a network to share various system resources. In such systems, there is generally no single trusted central manager that can implement the security policy for the system. As such, each system resource on the network is often required to implement its own security policy.

In such distributed systems a user typically requests access to a particular system resource. That system resource is then itself responsible for determining the access rights of the requester and allowing or rejecting the requested access.

The need for each resource to enforce its own security policy often results in complexities not encountered in timesharing environments. For example, each principal (e.g., user) on a distributed system is often assigned a user name. Access to the system resources is often on the basis of the particular access rights associated with a particular user and his name.

In theory, each system resource could include a listing of all of the principals and their access rights and user names. However, such a situation is often impractical as it would require additional memory and maintenance for each resource. Further, if numerous system resources exist, the addition (or deletion) or one principal's would require the modification of numerous lists.

One alternative utilized in the prior art is to have a central list accessible to all resources on the network. Because of the need for all system resources to have access to all of the principals and their names, a list of the principals and their names is often stored in a "global naming service" (GNS). A global naming service is a system resource which contains a list of all of the principals authorized to use the system and their names. Unlike a timesharing environment where the naming service is centrally controlled, in a distributed environment, the naming service is merely one of many system resources.

In most security systems, access to a system resource is determined on the basis of group memberships. Thus, the security policy of a particular resource may dictate that members of only a certain number of selected groups have access to that resource. Because the principal requests access to the resource, the resource must determine whether the requester is a member of one of the selected groups. If so, access is allowed. If not, access is denied.

Because it may be desirable for groups to contain other groups (or subgroups) the verification of a particular principal as a member of a large structured group can often be extremely slow.

1.3. Security Needs for a Distributed System

As discussed above, security systems for distributed networks ofter encounter complexities not found in centralized networks. For example, any system attempting to provide security for a distributed network must have the ability for a user to authorize a computer to operate on user's behalf and only to do so while authorized. Further such a system should have the ability for an authorized computer to present authorization to other computers in a secure and verifiable manner; and the ability for the user to rescind the authorization.

Because distributed systems generally have several workstations, it is desirable to allow a user to access the system resources regardless of which workstation he is logged into. However, because all systems on the network cannot be equally trusted, it may be desirable to prevent a user from accessing certain information on certain untrusted workstations.

Second, because distributed networks often have a large number of network entities, it is generally desirable to organize the entities into manageable groups. To implement a security policy properly, it is desirable to be able to manage these groups through an effective security policy.

2. SUMMARY OF THE INVENTION

The present invention addresses the goals discussed above through the use of a unique distributed security system. Each entity on the distributed is given a unique name and a private key. This private key enables each entity to identify itself to other entities and to encode certain messages. The messages encoded by the private keys may be decoded through the use of public keys. The public keys are stored with the entities names in a global naming service.

The global naming service includes a list of each of the entities, and a listing of the groupings and subgroupings into which the entities are divided. A group hint may be stored with the entities' name to enable fast searching of large groups.

Each entity may delegate access rights to other entities on the network. To prevent improper use of delegation, the present invention provides for the generation of different session keys each time the user logs onto or off of the network.

A unique method for implementing security policies is also disclosed. An access control list is provided for each system resource. This access control list contains a list of all possible access privileges and the user's that have these privileges. Thus, when a user requests access to a system resource, the user's name is compared to the resource's access control list. If the user's name if found on the list next to the requested access, access will be granted.

The methods, techniques, and data structures described here may be implemented by loading one or more sequences of program statements from a program storage device (e.g., a computer tape, a magnetic or optical disk storage device, or other storage means) into the memory or memories of a digital computer or computers configured as described herein and causing the computer(s) to execute program sequences as appropriate. The design and development of specific program sequences is a matter of routine work for persons of ordinary skill (which of course should include familiarity of the computer(s), operating system(s), etc., that are selected for the implementation) who have the benefit of this disclosure.

3. BRIEF DESCRIPTION OF THE DRAWINGS

FIGS. 1A and 1B illustrate an example of using RSA encoding for authentication;

FIGS. 2A and 2B illustrate an example of mutual authentication by identifying up to a common ancestor;

FIG. 3 illustrates a global naming service in accordance with the present invention;

FIG. 10 illustrates the basic access right expressions in accordance with the present invention;

FIG. 11 illustrates an access right expression in accordance with the present invention;

FIG. 12 illustrates example groups;

FIGS. 13A-14C illustrate ACLs in accordance with the present invention; and

FIG. 15 illustrates a timesharing computing environment.

4. DEFINITIONS AND CONVENTIONS

Figure 4A:
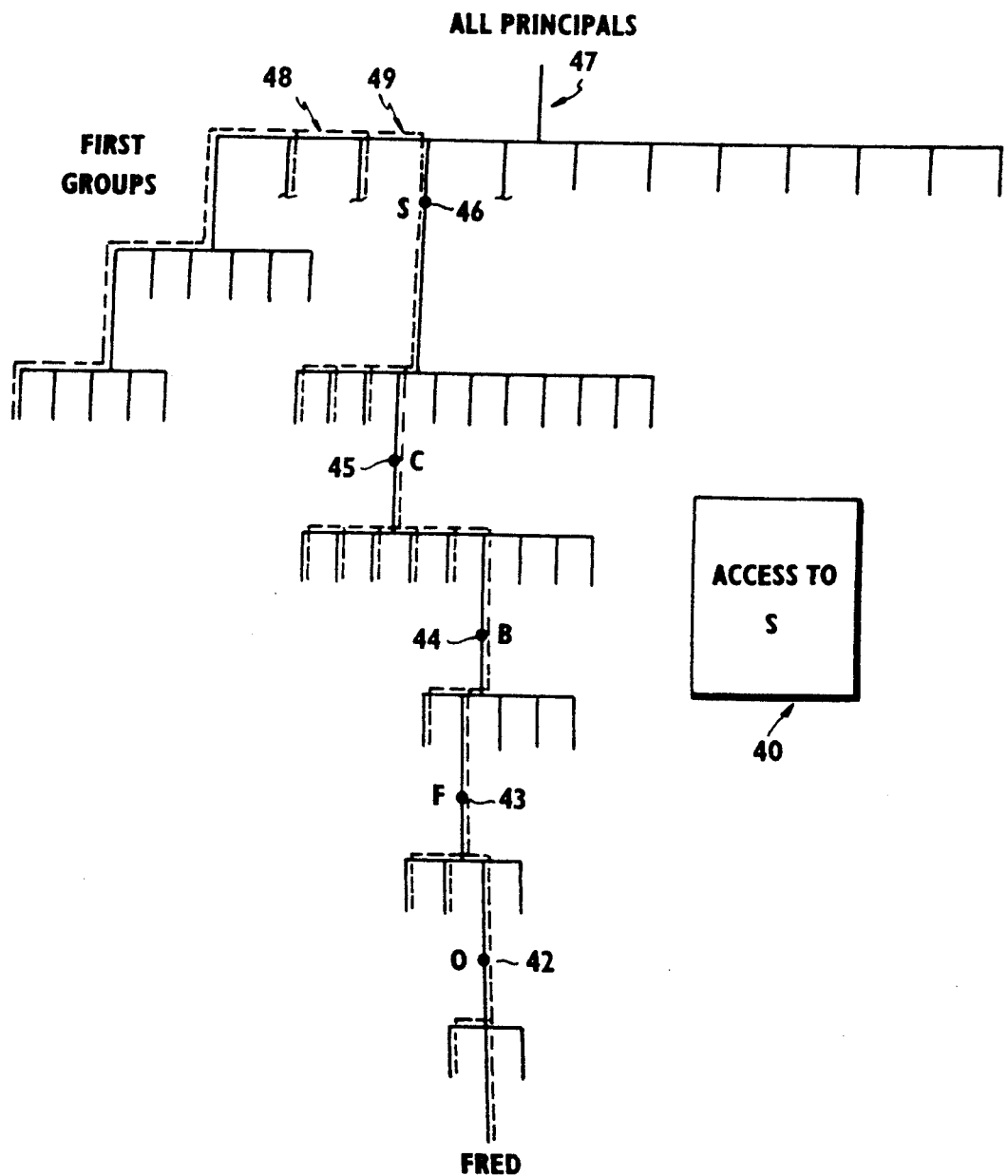
FIG. 4A illustrates a hierarchical search performed without the use of search hints.

This specification discloses aspects of a distributed security system in which access to system resources is controlled by access control lists associated with each system resource. When a user makes a request of a resource, the reference monitor (i.e., the manager of access to the resource) for that resource looks for the requesting user on that resources access control list. If the user's name is found (or membership in a group is verified), the requested access is granted.

Because the system of the invention deals with encoded and decoded messages and with public and private (secret) keys, a convention is adopted for ease of illustration. The public key of a principal is represented as xxxxP, where xxxx is the name of the principal, and the capital P indicates that it is a public key. Conversely, the private or secret key for a principal is represented as xxxxS, where xxx is the name of the principal, and S indicates that it a private or secret key.

Brackets [] are used to indicate that a message has been encoded. The key that has been used to encode a particular message may be represented to the right of the closing bracket. For example, if a message YYY is encoded using the private key of principal david, the encoded message is represented as [YYY] davidS.

The message obtained when an encoded message is decoded is represented through the use of parenthesis, (). The encoded message to be decoded is represented within the parenthesis, while the key used to perform the decoding is represented to the right of the closing parenthesis. For example, if the example message above is to be decoded using the public key of david, the resulting message is represented as ([YYY] davidS) davidP. Because the key davidP is the complement to davidS, the decoded example will be equivalent to the original, uncoded message. In other words, YYY=([YYY] davidS) davidP In the specification and claims that follow, the term "workstation" is used in its generic sense and, as such, describes various types of computer systems.

5. AUTHENTICATION

In order to implement a security policy controlling the exchange of information throughout a distributed system some mechanism should exist for uniquely identifying each of the network systems. Only in this manner can the access rights of each system be determined and controlled. This process of identifying and verifying a principal on the network, is known as "authentication." In an embodiment of the present invention, authentication is accomplished through the use of RSA cryptography and a global naming service.

The authentication process illustrated here is a two-part process. First, a user seeking to authenticate itself must demonstrate knowledge of a particular private key. Second, the entity receiving the authentication request must accurately be able to determine that knowledge of a particular private key implies a particular principal name. These two components of authentication are kept separate in the present invention.

5.1. RSA Cryptography for Verifying Knowledge of a Particular Private Key

RSA cryptography, disclosed in U.S. Pat. No. 4,405,829 to Rivest et al., is well known in the art. RSA cryptography involves the use of a public/private key system.

In connection with the present invention, each principal on the network is assigned a particular "private key". This private key is a code that is exclusive to that principal; it is not disclosed to any other principal on the network. Thus, for security purposes, it is assumed that each private key is kept secret by its principal. For this reason private keys will be referred to in this specification and drawings as xxxS, where xxx identifies the key, and S indicates that it is a private (or Secret) key.

Corresponding to each private key is a public key (to be represented as xxxP). A public key is associated with each principal on the network. This public key may be made known, and shared with other principals on the network.

As known in the art, and described in the Rivest et al. patent, the public and private keys are generated in such a manner that knowledge of the public key does not reveal the private key.

The public and private keys operate together to allow the coding and decoding of messages. Thus, a message encoded using a private key may only be decoded by the public key that corresponds to that private key. Alternately, a message encoded using a public key may only be decoded by the private key corresponding to that public key.

FIG. 1A provides an example of using RSA encoding for authentication. P2 establishes a communications channel over which it wishes to converse with P1. If principal P2 wishes to converse with principal P1 it must first persuade principal P1 that it is indeed principal P2.

This may be done by principal P1 generating a challenge to principal P2. This challenge (sometimes referred to in the art as a "nonce") comprises a random number X that is sent to principal P2. This nonce message is illustrated as 14.

After receiving this nonce 14, principal P2 sends to P1 the value obtained when the number X is "signed" (encoded) by principal P2's private key (twoS). It also includes in this message its corresponding public key twoP. This message is illustrated as shown at reference numeral 16. As may be discerned, the random number X is illustrated as being "locked" by the key twoS. This illustrative convention illustrates that the message within the brackets has been signed (encoded) by the key at the right of the bracket.

Thus, the message may only be decoded (unlocked) by using the key complementary to that outside of the brackets. For example, in FIG. 1A, message 16 shows the number X encoded by the key twoS. As such, this message may only be decoded through the use of twoP (the complement to twoS).

After receiving message 16, principal P1 can compare the uncoded number X (from message 14) with the value obtained when the signal 16 is decoded using the public key twoP (which was provided in the signal 16). If the two values match, then principal P1 knows with certainty that it is communicating with a principal possessing the private key twoS. Because P1 has chosen the value of the challenge X, it is not possible for an imposter to impersonate P2 by replaying a response from the real P2 captured from a previous exchange. This process is illustrated in FIG. 1B. This is the first part of the authentication process.

If principal P1 can somehow associate the private key twoS with principal P2, then principal P1 knows that it is communicating with principal P2, inasmuch as no one else could have signed number X with principal P2's private key.

A similar exchange in the opposite direction allows P2 to authenticate P1. Once each principal is assured of who he is talking to, messages may be sent over the communications channel. Note that to prevent an imposter from subsequently breaking into the conversation, the communications channel must be secured by means generally known, such as physical security or conventional secret key encryption.

In the above example, principal P2 provided its public keytwoP in message 16. In one embodiment of the invention principal P2 provides only its user name. In this embodiment, principal P1 would have been responsible for determining the public key associated with the user name sent in the message.

5.2. Improved Global Naming Service

The above discussion of authentication placed particular emphasis on the relationship between a particular principal and the public and private keys associated with that principal. Each principal on the distributed network of the present invention is assigned a name and a private key.

As discussed above, in order to determine which principal is requesting authentication, the non-requesting party must (1) determine that the requesting party has knowledge of a private key, and (2) determine which particular principal is identified by that private key.

In connection with the present invention, principals are identified through the use of "principal names." A principal name is an identification code that uniquely identifies a principal. In one embodiment, the principle names are human readable and understandable so that people can specify this nameon access control lists. Because the security system of the present invention is geared toward principal names, not private keys, some mechanism should exist for associating the public and private keys for each principal with its name.

This function is accomplished through the use of an improved global naming service (GNS). This naming service is a depository of principal names, their associated public keys, and other relevant security information. This information (the principal names, public keys, etc.) is stored in name "certificates" that are signed (encoded) using the private keys of particular principals that have some degree of trust. Because these principals certify that a particular principal has particular access rights, they are sometimes referred to as certifying authorities (CAs).

(a) Trust and the Improved Global Naming Service. The improved GNS need not be fully trusted. This is beneficial in that is simplifies the design and maintenance of the GNS. Further, the overall security of the system is increased because many different servers do not have to be trusted.

For purposes of the present invention, the GNS should be trusted only for "rapid revocation". This means that if a key is compromised, the global naming service can be trusted to delete the naming certificate if requested to do so by the appropriate principal. Methods for developing such a limited trust GNS are known in the art and will not be discussed herein.

(b) Principal Names: Two Basic Types. The named principals contained in the global naming system may be of at least two types: users and systems. A "user" is defined as the person who uses systems and resources, and instigates access to "objects". A "system" is basically defined as a state machine (i.e., a device that when given a current state, a translation function, and some inputs yields a new state and a set of outputs). In simple terms, a system is a computer running a piece of specific software. A system may be a computer running a certain piece of software, or a process running underneath another system (e.g., a process running within a particular operating system). Systems having other systems running underneath them are sometimes referred to as "engines".

5.3 Certifying Authorities

As briefly alluded to above, the global naming service of the present invention actually contains certificates that are encoded (signed) using the private keys of special principals known as certifying authorities (CAs). Thus, any principal possessing knowledge of a particular certifying authority's public key may decode and read these certificates.

For example, the certifying authority for a particular system may be a group manager who is normally not connected to the network. When the network manager wishes to add a principal to the GNS, he may go "on-line" onto the network, use his private key to encode the information concerning the new principal (e.g., the principal's name and public key), and deposit this encoded message into the GNS. In this manner, anyone having the public key of the network manager may access the added certificate, (which contains the new principal's public key) determine that a new principal has been added to the group, and attempt to access (or receive access requests from) the new principal.

(a) Multiple Certification Authorities; Certification Authority Hierarchy. For large networks, more than one certifying authority may exist. Multiple certifying authorities may be used to ease management concerns and improve performance and security. In the present invention, these multiple certifying authorities are organized into a specific certification authority hierarchy.

When multiple certifying authorities are used, the global naming service may be divided into several directories and subdirectories. Each directory should contain certificates (signed by the certifying authority for that directory) for the principals and subdirectories within the directory; further, each directory should identify the parent directory's certifying authority. In addition to the multiple directories, when multiple certifying authorities are used, each principal should maintain both its private key (which it keeps secret), and the public key of the certifying authority for the directory in which it is named. Generally, the certifying authorities at the nearby branches of the directory will be trusted more than those controlling more remote directiories. Since the structure of the namespace is expected to reflect the structure of the organization using it, this naturally reflects the greater trust one places in more closely related organizations.

Thus, when two users not certified by the same certifying authority wish to mutually authenticate, the various certification authorities must cross-certify each other. This requires the certifying authorities to identify each other up to a common ancestor.

FIG. 2A illustrates one example of such authentication. As illustrated there are seven principals P0–P6. Each of the principals has a naming certificate stored in the global naming service which is signed by the certifying authority for the directory in which it is found. For example the global naming service entry for principal P5 would contain a naming certificate signed by certifying authority CA2.

If principal P6 wished to authenticate itself to principalP2, P2 could send a message containing a nonce (e.g., an uncoded randomly generated number) to P6. P6 then returns the nonce encoded under its private key P6S. Such a message is illustrated at reference numeral 30 in FIG. 2B. After recieving this message, principal P2 can look up the certificate for principal P6. However, this certificate is signed by CA2; P2's certification authority is CA1, so P2 has no a priori means of verifying the certificate. P2 solves this problem as follows:

P2 knows the public key of his CA, CA1P. In the naming service, he finds the certificate signed by CA1 that identifies CA1's parent to be CA0 and its public key to be CA0P. He verifies this certificate by decoding it with CA1P.

P2 then looks up the certificate signed by CA0 that certifies CA2. He decodes this with CA0P obtained above and learns that CA2's public key is CA2P. Finally, P2 can decode the certificate that associates P6 with its public key P6P and verify that P6 correctly encoded the nonce with P6S.

Because the certifying authority for CA1 trusts certifying authority CA0, and likewise certifying authority CA0 certifying authority CA2, it follows that principal P2 can then trust certifying authority CA2. (b) Contents of an Authentication Certificate. In its simplest form, an authentication certificate contains the name of a principal, its public key, and a time period of validity. (When multiple certifying authorities are used, the certificates may also contain the name of the certifying authority.) As discussed above, these authentication certificates are signed by a certification authority and are stored in the global naming service.

A time period of validity is included with the authentication certificates to ensure that a compromised principal does not stay on the network indefinitely. When a authentication certificate is stored in the global naming service, so too is a period of validity. When the period of validity has expired, the authentication certificate is no longer valid. As such, the authentication certificates must be periodically updated.

6. VERIFICATION OF GROUP MEMBERSHIP

As discussed above, the global naming service contains a listing of all of the principals authorized to operate on the network. When a distributed network becomes large, this list can often become quite lengthy. A system in accordance with the present invention allows numerous users to be lumped together and treated as a single unit called a "group".

In distributed systems, multiple objects often must be accessible to the same sets of users. These sets of users can be quite small (e.g., two users) or they can be quite large (e.g., 100,000 users). In order to effect fast and manageable access, principals who are considered equivalent for security related purposes may be combined into a group. A group may be thought of as a list of principals. The entries within a group make up the "group definition".

As discussed below, the entries in a group may be signed certificates see section 6.2, below or simply a list of names.

6.1. Nested Groups and Subgroup Searching

Just as a group may contain a principal name as one of its entries, so too may a group contain another group (a "subgroup"). This nesting of groups allows large groups to be expressed as trees of other subgroups.

In the absence of specific optimization (discussed below), extensive searching of a group and its subgroups must be carried out for membership verification. For example, if a group has ten subgroups, each with ten members, the possibility exists that each of the 10 subgroups must be searched before a certain principal is identified as a member of the group. Such searches may be extremely slow. While the structure of an individual group can be optimized to allow a fast search, the various subgroups are likely to be distributed over different portions of the global naming service.

6.2. Certification of Groups

Because the storage medium of a group definition may not be adequately secure, the group definitions may be certified. This is done by enclosing the group definition in a certificate, or multiple certificates signed by some appropriate certifying authority. The certifying authority should be the entity that has control over the group. The group's certifying authority (GCA) may in turn be certified by the certifying authority of the group's parent directory in the form of:
certifying authority certifies that GCA with key GCAS may sign membership certificates for group G
This format is similar to that used to certify a directory certifying authority.

For reasons of efficiency, it may be desirable to represent group membership with multiple certificates. For example, consider a group having as its members the principals P1, P2, P3 . . . pn (where P1, etc. are either individual principals or other subgroups (principal-sets)). Such a group is represented by a certificated for each principal-set, e.g.,;
GCA certifies that P1 is a member of G
GCA certifies that P2 is a member of G
GCA certifies that P3 is a member of G
GCA certifies that Pn is a member of G These certificates have the same form as the certificates that certify a principal, except that certificates that authenticate a principal associate a particular public key with a principal's name, whereas group certification keys associate a particular principal with a group.

Because membership in a group is asserted in a certificate, it is not possible for a misbehaving (or compromised) entity to forge bogus group membership. A storage device can refuse to furnish a certificate when requested, or deny its existence, but it cannot forge a bogus certificate. In most instances, failure to furnish a certificate would only deny membership in a group, and therefor deny access to some object.

While a entity could not create a bogus certificate, the possibility exists that the entity may retain a certificate that has been revoked. To reduce this risk, the group membership certificates may have a timeout period (i.e., the membership certificate expires after a predetermined time period unless re-asserted).

Some groups may be uncertified (i.e., a group stored without the benefit of certifying certificates). The groups are only as secure as the entity that controls modification access to the group list.

6.3. Problems Arising from Large Groups and the GNS

As discussed above, the names of all entities on the network are stored in a global naming service along with certain attributes for those entities. Also stored in the global naming service are the group definitions. The definition of a group is found under the naming service entry for that group's name. As noted above, this ground definition consists of a listing of each of the members of the groups. The group definition may also include a listing of subgroups.

As discussed above, for security purposes, the listing of a group's members is done through the use of certificates. These certificates are messages "signed" by trusted authorities that verify group membership. The certificates which comprise a group definition (when decoded) merely provide the name of a principal (or sub-group) that is a member of that group; the security attributes are stored with the name of that principal in the global naming service.

When a principal attempts to access a system resource, the groups having access to that resource must be searched to determine if the requesting principal is a member; each subgroup in a group, and each sub-sub group must also be searched. To perform such a nested search, each of the global definitions for the sub-groups and sub-sub-groups must be accessed at different locations in the GNS. In large networks, having numerous users with numerous subgroups, this type of searching can take considerable time.

6.4. The Use of Search Hints

To improve searching speed, group membership hints may be stored with the principal's name in the global naming service in the form of:
P is a member of group G by virtue of membership in G' where G' is a subgroup of G that lists P as an explicit member. Where multiple nested subgroups exist, e.g., P is a member of G1; G1 is a member of G2; G2 is a member of . . . Gn., several hints may be stored with the principal's name in the form of:
P is a member of group Gj by virtue of his membership in G1 For j=1 . . . (n−1)

Note that the hint list is inverted order. In other words, the hints indicate P is a member of the largest group possible. This is because it is the searches of large groups that slow down the search process.

For example, suppose that a principal named FRED has an office O in a particular wing W of a particular floor F of a particular building B in a particular city C of a particular state S. Several hints could be stored with FRED's name in the global naming service as illustrated in FIG. 3.

The first entry in the global naming service for principal FRED is an authentication certificate 31 that is signed using the private key of the certifying authority CA. Also found in FRED's global naming service entry are six hints (32–37) indicating FRED's membership is certain large groups. The use of these hints greatly decreases the amount of search time needed to verify membership in a particular group. Using the same principal FRED, as in FIG. 3, FIG. 4a illustrates a search done without using hints. In this example, a resource 40 allows write access to all members of group S. Without the use of hints, each office of each wing of each building of each city of each state must be searched until a match for FRED is found. Specifically, each group and subgroup of branches 48 and 49 will have to be completely searched, as will many if not most of the branches of group 46.

Figure 4B:
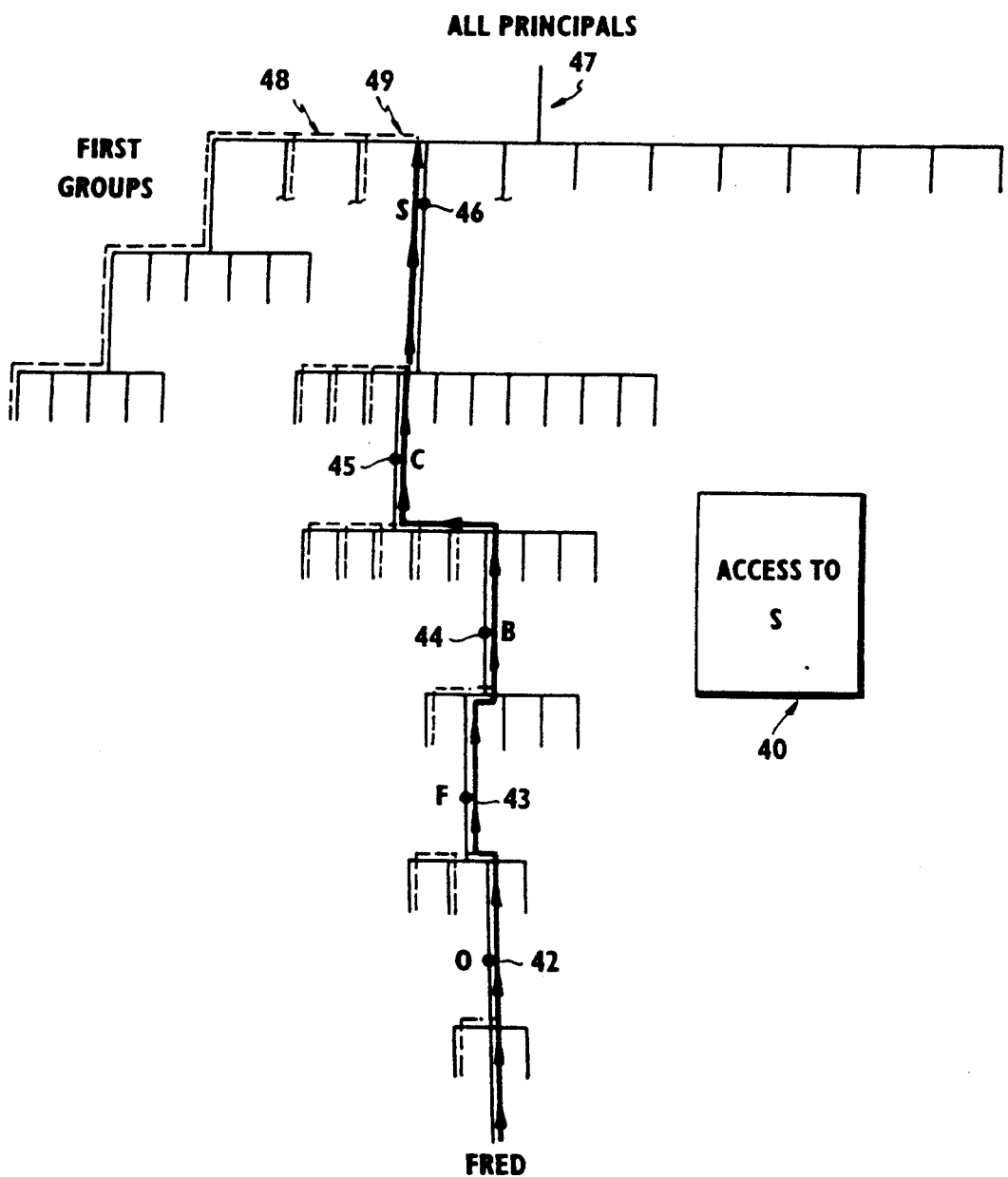
FIG. 4B illustrates a hierarchical search performed with the search hints in accordance with the present invention.

The search speed is greatly increased when hints are used. As illustrated in FIG. 4B, with hints, principal 40 now has a hint that FRED is in S via his membership in group O. The reference monitor then merely has to expand group O, and verify that group O contains a membership certificate 41 for FRED. Resource 40 may also have to verify that group O is a subgroup of group S, but this can be done through the use of hints for groups as discussed below.

In the above example, hints were provided for each group of which FRED is a member. Generally, it is not beneficial to have hints for each and every subgroup. Thus, it may be desired to include hints only for the largest of groups. For example, assuming that the subgroups of group 44 are not too large, only the hints as to membership in groups S, C, and B may be provided.

For the above example, once it is determined via a hint that FRED is a member of group S via membership in group B, the search for FRED as a member of group B would be accomplished as if no hints were used.

6.5 Hints for Groups

Although described above with respect to principals, search hints may be stored for groups that are members of larger groups. For example, if a group G1 is a subgroup of G2 which is a subgroup of G3 . . . which is a subgroup of Gn, the hints may be in the form of:

G1 is a member of group Gj by virtue of membership in G2. For j=2. . . (n−1).

The searching procedure for such group hints is substantially the same as that used for principal hints.

6.6 Preventing Search Delays

The presence of hints reduces the search time of a large group. To avoid excessively long searches, it may be desirable for a large group to have as an attribute that a hint is required before a search will be performed. Thus, if a principal lacks the hint for an "inversion hint required" group, the membership test fails quickly.

Alternately, a maximum search effort may be defined for a group lacking hints. Once the maximum search effort is exceeded, the access attempt fails with a "group too big error".

6.7 Inversion Hints and Security

The inversion hints for a principal merely limit a search to a particular group (or subgroup). It is from this limited group that the certificate attesting to the principal's membership in the group is obtained. Because the group membership is still certified by the group certifying authority, the inversion hints do not attest to the principal's membership in any group, and do not have to be certified.

In other words, the certificates attesting to a principal's membership in a group are stored with the actual group definitions, not with the principal's name. Thus, the information provided in the him is truly only a hint and can at worst deny access if it's wrong or if the principal feigns membership in a group that it isn't a member of.

Separating the principal's membership certificates from its name preserves the control needed over revocation. For example, if the membership certificates were stored with the principal's naming service then whoever had write-access to that entry could subvert group revocation by merely replacing the certificates.

6.8 Maintaining the Search Hints

Because group membership hints constitute a duplicate representation of the group memberships in the distributed environment, there some mechanism should exist by which the hints are kept in synchronization with the actual group definitions. The problem is complicated by the fact that in general the individuals managing a group may not have writing access to the naming service entries of the members. There are several possible mechanisms for keeping the hints current.

(a) Electronic Mail and Hint Maintenance. The management actions of adding or removing members from a group may result in electronic mail being sent to the affected principal, or the system manager controlling that principal's naming service entry. This mail may be interpreted to add, update, or remove the affected hints. The use of electronic mail is known in the art and will not be discussed herein.

(b) Daemon Processes to Maintain Hints. A daemon process, running under an authority which has write access to the principal's naming service entry may be used. This process may either:

(1) scan all of the large groups in the naming service and add or update the principal's hints in their naming service; or (2) scan the hints stored with each principal and remove those whose membership certificates are not found in their respective groups.

7. HUMAN USER AUTHENTICATION

The case of authenticating a human user is special in that the human user does not have direct control over a RSA private key. That control must rest in some piece of hardware or software that the user can trust.

One possible means for authenticating a human user is a "smart card." A smart card is a piece of electronic equipment that is electrically coupled to the users's terminal and has a keypad, display, clock, and logic for performing RSA operations.

A central certifying authority (perhaps a human resource manager) may issue a smart card to a human user. This smart card, when activated, should be willing to give certain information, including the name of the user, to anyone. The smart card should also be able to generate a nonce challenge that it gives to a workstation.

To initiate a computing session, the user and workstation mutually authenticate each other. This is accomplished by having the smart card issue the user's name and a nonce challenge to the workstation. Given the user's name, the workstation can retrieve from the global naming service all of the certificates needed to authenticate the user and determine that the user can logon to that workstation. As will be discussed below, this may be accomplished by the workstation comparing the user's name to its access control list.

The workstation signs the challenge with its private key and returns to the smart card the signed challenge, another nonce, a public key, and the certificates retrieved from the naming service that the smart card needs to authenticate the workstation.

The smart card authenticates the workstation by verifying the signed challenge and the certificates. It then displays the identity of the workstation on its display. The user, satisfied with the identity of the workstation, enters his PIN on the smart card to authorize the session.

The smart card now signs a message containing the nonce and public key received from the workstation and sends this message back to the workstation. The workstation can now authenticate the user by verifying the signature on the nonce using the certificates fetched above. The public key signed by the smart card gives the workstation the authority to act on behalf of the user, as discussed below.

8. DELEGATION

8.1. Basic Principles of Delegation

Once the user has authenticated himself to the workstation, he may access any local files within the workstation to which he has access. If the user, however, needs to access remote files on a remote system resource, the user must delegate to the workstation the ability to access those files on his behalf.

Figure 5:
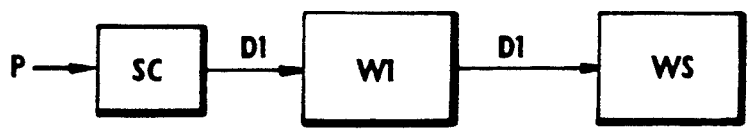
FIG. 5 illustrates delegation from a user to a workstation.

Such a delegation is illustrated in FIG. 5. In the figure, a user P has been authenticated to workstation W1, but wishes to access remote files in resource Ws. Ws receives access requests, not directly from the user P, but from workstation W1. Because access rights are defined in terms of the user, the reference monitor in the server Ws must have some way of verifying that the access request did indeed originate with the user P.

This verification is accomplished through the user of "delegation certificates." The delegation from the user to the workstation is represented by a certificate, signed by the user's smart card SC at the time of login. This is represented by certificate D1 in FIG. 5. This certificate indicates that the workstation is authorized to speak for the user. The delegation format illustrated indicates that the smart card SC 53 has signed a statement authorizing W1 to speak for user P. The workstation W1 forwards this certificate to the remote resource Ws as proof of delegation.

The remote resources may then compare the user P's name, as well as the name of the delegated workstation W1, with the names of the users and delegated systems in its access control list (ACL). If the requesting user on the delegated workstation is found in the ACL, then the user, through the workstation, is granted access to the resource.

8.2. Chained Delegation

Figure 6:
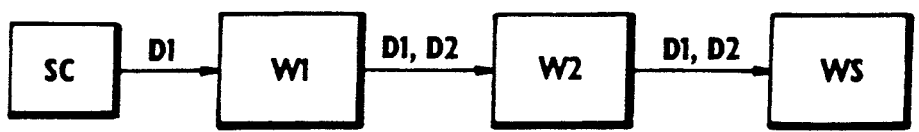
FIG. 6 illustrates chained delegation.

In many situations, more than one system is present between the user and the system resource. Such a situation is illustrated in FIG. 6. In that figure a user (not shown) on workstation W1 seeks accesses to a file on system resource Ws, through workstation W2. In this case, the user's smart card SC delegates to workstation W1 via delegation certificate D1, which in turn delegates to W2 via delegation certificate D2.

As discussed above, the first delegation happens where workstation W1 is authorized to speak for the user (certificate D1 in the figure). The second delegation says that workstation W1 permits W2 to speak for the user. Before making an access request to system resource Ws, the workstation W2 forwards a copy of both its own delegation certificate D1 and the workstation's delegation certificate D2.

Through a chain of reasoning using both delegation certificates and the authentication certificate, the system resource Ws can conclude that workstation W2 is indeed authorized to speak for the user P. As before, both the user's name, and the names of workstations W1 and W2 must appear on the resource Ws's access control list.

Although illustrated with only two delegations, a long delegation chain may exist between several workstations. To effect such a chain, the system resource Ws must receive and verify all of the delegation certificates.

For security purposes, the delegation certificates are only valid for a limited time period (approximately a day).

8.3. Delegation to a Session Key (a) The Need to Terminate Delegations. One security problem with the above delegation system is that the identity of the workstations W1 and W2 are relatively permanent. Thus, once the user P authorizes workstation W1 to speak for him, the workstation W1 can make requests in user P's name as long as the delegation certificate is valid. Since the valid time period for a delegation is generally longer than most user computing sessions, there is a possibility that workstation W1, if compromised, could continue to make requests for user P even after P is logged out of the system.

This problem cannot be solved by merely erasing the delegation certificate from workstation W1's storage. The delegation certificate has been transmitted to other parties (e.g., workstation W2, system resource Ws). Thus, even if the delegation certificate was erased from workstation W1's storage, an intruder could obtain a copy from somewhere in the system (e.g., from system resource Ws), compromise the workstation W1, and begin making requests in user P's name. Under this system, a high degree of trust must be placed in workstation W1. In order to prevent unauthorized requests, workstation W1 must be protected from compromise not only while user P has an active session with workstation W1, but for all time subsequent to the initial delegation (i.e., the time between user logout and the expiration of the delegation). To avoid the need to place such high trust in workstation W1, the present invention makes use of session or delegation key pairs.

(b) The Session Key. To allow a delegation to be rescinded at a time of the user's choosing, a system in accordance with the present invention utilizes the concept of delegating to a session. A session is simply the context in which all a user's actions are performed on a computer. In one embodiment of the present invention a new public/private key pair is generated each time the user delegates to a workstation.

As discussed above, when the user P's smart card SC is inserted into the workstation the smart card provides the user P's name, and generates a nonce challenge. In the present embodiment, after verifying that the user P can access the workstation, the workstation generates a new public/private key pair, and sends to the user's smart card the new public key, as well a signed message containing the smart card's nonce challenge and the new public key. Note that because this public key is unique for each login, it also constitutes the nonce sent back to the smart card, which was called out seperatly in section 7, above. Thus, when the user's smart card receives the return message, it decodes the message using the workstation's public key and verifies that the response to the nonce challenge was correct. At this point the user's smart card knows the new public key with which the workstation is communicating.

Figure 7A:
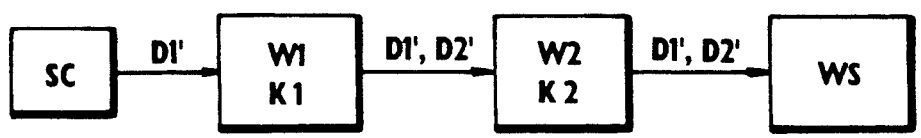
FIGS. 7A through 7C illustrate the use of session keys in accordance with the present invention.
Figure 7B:
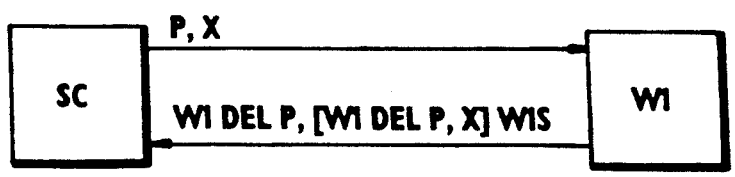
Figure 7C:

FIGS. 7A through 7C illustrate the use of such session keys. In FIG. 7A, the symbol K1 represents the new delegation key whose private key W1delS is held by workstation W1. After workstation W1 determines that the user P can access the workstation, it sends a message signed with workstation W1's normal private key W1S. This signed message contains the number generated by the user's smart card SC in the nonce challenge, as well as the new public delegation key W1delP.

As depicted in FIGS. 7B and 7C, the smart card SC, already knowing workstation W1's normal public key (from the certificates provided by the workstation), can decode the message which was encoded by workstation W1. If, after decoding the message, the coded number X matches the number generated in the nonce, it follows that the smart card SC knows that workstation W1 is indeed who it says it is. The smart card SC may then sign a delegation certificate D1' that says the entity having private key corresponding to public key W1delP is authorized to speak for P. This is illustrated in FIG. 7C.

Similarly, if a second workstation is needed to complete the chain, a second new delegation pair K2 (W2delS, W2delP) is generated by W2, and another delegation certificate D2' is generated and signed with the new private delegation key of workstation W1. This second delegation certificate D2' says that "the entity possessing the private key corresponding to public key W1delP says that the entity possessing the private key that corresponds to the public key W2delP may speak on its behalf."

The delegation certificates D1 and D2 continue to include the workstation names W1 and W2 because those names are needed for lookup in the access control lists (discussed below).

The system resource Ws only accepts requests from W2 on behalf of the user P if the requests are signed by the new delegation key W2delS. This is because the delegation certificate D2 (from W1 to W2) does not totally delegate authority to workstation W2. The delegation certificate D2 only delegates authority as long as workstation W2 possess the secret key W2delS.

In this embodiment of the invention, when the user P wishes to end a session he can instruct workstation W1 to erase the new private delegation key, W1delS. Because the private key W1delS was held secret by workstation W1, the delegation chain is completely destroyed, because any principal that attempts to use the delegation certificate must demonstrate knowledge of the secret key W1delS. Since there was only one copy of this secret key (and it has been destroyed), no one can use the delegation certificate D1 to make requests. Thus, even if workstation W1 (or W2 for the second delegation) is subsequently compromised, it cannot make unauthorized requests from P because the key necessary to support the delegation certificate D1 (or D2) has been destroyed.

As will be noted, this embodiment removes the need to place extended trust in workstation W1. In the present invention, workstation W1 needs only to be trusted to operate faithfully while the user is present, and to erase the private key W1delS when the user logs out. Trusting an entity to delete a single key at a certain time requires less trust than trusting that an entity never be compromised after a delegation. This is particularly important in an environment where the entity is a "public workstation" no longer under control of the user once he leaves the vicinity.

(c) Generation of Session Keys. Creating a new public/private key pair is a very computer intensive operation that may be improved in one or more of several ways.

In "pre-generation," a workstation can create several session keys ahead of time as a background process and have several key pairs available for when a user wishes to log in.

"Key pair economy" can be pursued by instructing the workstation to save a session key pair if no external requests are made using that pair, and delete the user's initial delegation certificate. This operation is premised on the fact that if the workstation has made no external requests, then the user's delegation certificate has not been transmitted outside the workstation, and erasing it assures its destruction.

Simplification of session delegation can be sought: if the identity of the workstation is not needed to implement the access control function, then the session delegation can be simplified by (1) leaving out the identity of the workstation in the delegation certificates (e.g., having a certificate say that "P authorizes anyone having private key corresponding to WxdelP to speak on his behalf"; or (2) not generating any additional session keys after the first (e.g., W1 simply transmits a copy of the user's delegation certificate and the new public delegation key to W2). For the embodiments using alternative number 2, a privacy-protected channel must exist between W1 and W2.

9. ACCESS TO OBJECTS

As discussed above, an "object" is something in the system to which access is controlled. Access is controlled for a given object by granting or denying a principal's access to that object in accordance to the security model to be implemented.

Access control decisions for each object are made locally by the reference monitor controlling that object on the basis of specific access control data for that object. The specific access control data for each object are preferably stored with that object in the form of access control lists (ACL).

Generally speaking, when a principal requests access to an object, that object's reference monitor attempts to locate the requesting principal's identity in the ACL for that object. If the principal's identity is found, the access requested by the principal is compared to the access allowed by the ACL entry. If the ACL entry indicates that the access requested is allowed, then access is granted; if the requested access is not allowed, or the principal cannot be found in the ACL, then access is denied.

9.1. Access Control Lists (ACL)

(a) Generally. Generally speaking, an "access control list" (ACL) is a data structure that associates access rights with sets of named principals. In its most basic sense, an ACL may comprise a list of the names of the principals which are allowed access to the object associated with that ACL, and an indication of the access rights that are allowed.

The creation of ACLs is a matter of routine work for a person skilled in the art having the benefit of this disclosure. Past examples of ACLs include the SOGW protection mask, the ACL in VMS, and the OGW file protection modes in Unix.

The access rights for a particular principal are the operations that a reference monitor will allow that principal to perform on its object. Traditional access rights are read, write, delete, etc.

In accordance with the present invention, access rights include any request that can be implemented by an object. Thus access rights include such things as the ability to make requests of a file service, to join a cluster, and to change a process's priority.

The access rights are generally associated with principals through the use of "access right expressions." Such access right expressions will be discussed in detail below.

(b) The ACL as an Object. Because ACLs may need to be read or changed, they themselves fall within the definition of "objects." As such, each ACL itself has an ACL that specifies who can read or modify it. In order to avoid infinite regress, the second level ACL (i.e., the ACL's ACL) may be its own ACL. Thus, in addition to the access rights discussed above, the ACL for an object may include an entry indicating that the principal can read or write to that ACL.

Figure 8:
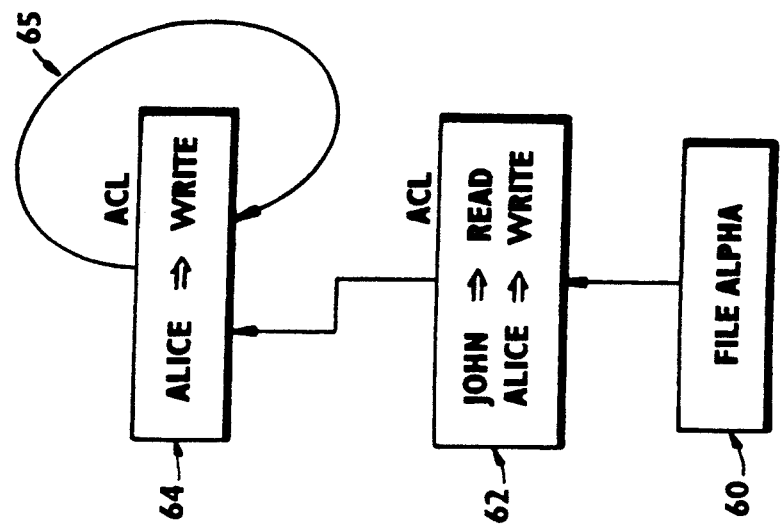
FIG. 8 illustrates an access control list (ACL) in accordance with the present invention where read access to the ACL is granted to those principals that are able to read the corresponding object, and write access is granted to those having write access to the object.

It may be desirable to grant read access to an ACL to those principals that are able to read the corresponding object, and write access to those having write access to the object. Such an embodiment is illustrated in FIG. 8. In that figure an object 60 (a file ALPHA) is illustrated with its ACL 62. As shown, the principal JOHN has read access to the object 60 and principal ALICE has read access to both the ACL 62 and the object 60. An arrow 65 indicates that the ACL 64 is its own ACL.

(c) Authentication and Principal Storage. To mediate access, the reference monitor for an object must interpret that object's ACL. For security reasons, each principal or group named in the ACL should be authenticated by the reference monitor. (The authentication process is discussed above)

(d) ACL Structure. As discussed above, the ACL is a structure for associating access rights with a set (or sets) of principals. A system in accordance with the present invention uses a variety of operators to construct the sets and to associate the access rights. These operators are discussed in detail below. Development of hardware (or software) implementations of the disclosed operations is routine work for a person skilled in the art having the benefit of this disclosure.

The access rights granted to a particular entry in a group may be controlled through the use of access right expressions. Thus, a group may sometimes be throught of as an mini-ACL.

Figure 9A:
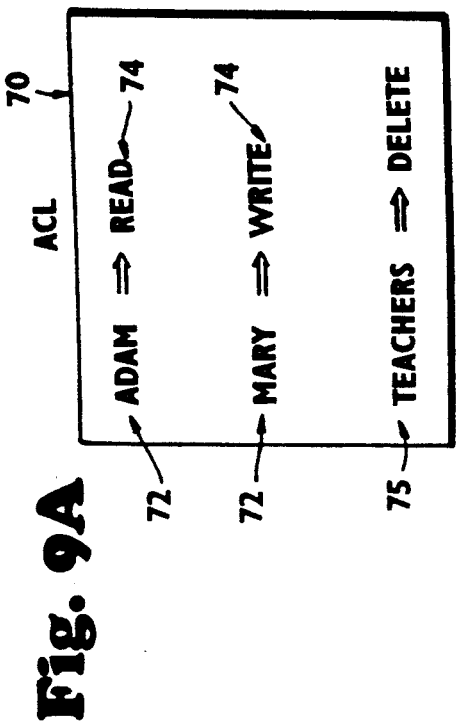
FIGS. 9A and 9B illustrate ACLs and group definitions in accordance with the present invention.

When an ACL includes a group as an entry, the contents of that group in effect become part of that ACL. As FIG. 9A illustrates, an ACL 70 may contain several principal entries 72, as well as the access rights associated with those entries 74. The ACL 70 may also contain group entries, for example group TEACHERS 75. These group entries effectively make the groups referenced thereby part of ACL 70.

Figure 9B:
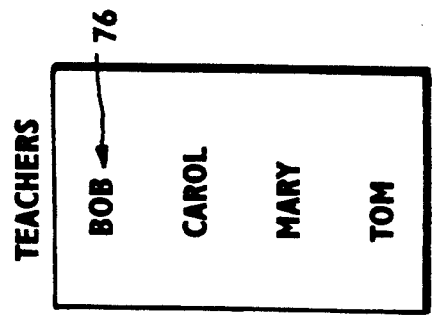

FIG. 9B roughly show the group definition for group TEACHERS. Thus principal BOB (while not directly in the ACL 70) will be allowed access to the object controlled by ACL 70 because BOB is found in group TEACHERS. Because ACL 70 grants only delete-type access to TEACHERS, and therefore to BOB, he cannot write to the object controlled by ACL 70.

9.2. Access-Right Expressions and Constructs

An access right expression specifies the specific access rights granted to a set of principals (or groups). This represents the ultimate purpose of the ACL and is therefore discussed in detail here.

FIG. 10 illustrates the most basic access right expression. In that figure, a principal-set 80 is granted the specific access-right 81 listed. The symbol=> represents such an granting of access rights. As will be discussed below, a principal-set is a grouping of principals by either name or group.

FIG. 10 also illustrates a second form for access right expression. As illustrated, symbol > indicates that the principal-set 80 may be delegated the specific access-right 81'. As discussed below, a principal may delegate authority to other principals to act on his behalf. An expression such as the one illustrated in FIG. 10 prevents allowing an untrustworthy system from being delegated too much authority. Delegation is discussed in detail above.

FIG. 10 also illustrates a third form that an access right expression may take. In this expression, the principal-set 82 is listed with no access rights. The listing of a principal-set with no access rights implies that the specified principals are granted all possible access rights.

The principal-sets discussed above may comprise a listing of principal names, a group, or a construct of principals and/or groups. For purposes of this specification, the term "principal-set" will refer to a list of principal names, while the term "NAME" will refer to a group.

When a listing of principal-set comprises a listing of principals, each of the listed principals is granted the access rights indicated by the access right expression. For example, in FIG. 11, principals BOB, JOHN, and CARL are all given the access right S, as are all of the principals in group ONE.

Four principal-set constructs are utilized in the embodiment illustrated here. Each will be discussed separately.

(a) Principal-set OR Principal-Set: The UNION of Groups. The construct A OR B, where A and B are principal-sets, means that A and B are both members of the set. In other words, to be allowed access, the accessor must be either A or B. The following equation illustrates this construct.

A OR B => S principal-set => access-right

The above caption indicates that both A and B have access right S for the object controlled by the ACL having this access equation. If the principal seeking access is either A or B access right S will be granted. This is because the basic principal-set comprises the union of A and B.

(b) Principal-set AND Principal-set: The INTERSECTION of Groups. When the ACL contains the construct A AND B, to be allowed access, the accessor must be both A and B. In the present invention the operator AND represents the intersection of set A and B. The following provides an example.

A AND B=>S principal-set=>access-right

In order to prevent the ACL from improperly granting access to either A or B, access should be denied unless A and B are both acting in concert. Only then can the ACL be sure that the entity requesting access to the object (having the authority of both A and B) has the access right S.

(c) Principal-set—name: Group EXCLUSION in Hierarchical Groups. In the third construct, principals or groups being subtracted out of the principal-set must be members of the groups to the left of the "—". Thus, before this construct may be applied to a principal-set (or group) it must be determined that the group on the right is a subgroup of the principal-set (group) on the left. This construct means that the members of the final principal-set comprise all the members of the initial principal-set that do not derive their membership by being members in the named subgroup.

The following provides an example of this construct:

A−B=>S principal-set=>access-right (B is a subgroup of A)

Thus, the present interpretation of this construct yield a final principal-set which is equal to all of the principals in A which do not owe their existence in A to being in subgroup B. When determining whether a principal is a member of A−B all of the subgroups of A except B should be searched for that principal, i.e., A−B means skip subgroup B when searching the subgroups of A.

In the context of the present invention this construct provides several advantages. First, as discussed above, a misbehaving or compromised group may assert that a particular principal is not a member of a group (i.e., it is not possible to reliably assert group non-membership).

Under traditional interpretations of A−B (i.e., all of the members of A except those that are members of B) an improper granting of access rights may result. For example, assume group A contains subgroup B, and principal ALICE is a member of subgroup B. (This example is illustrated in FIG. 12). If subgroup B is compromised, it may assert that ALICE is not a member of that subgroup. The traditional interpretation of A−B=>S would improperly grant ALICE access right S since she in not found in subgroup B.

Under the construct of the present invention compromise of subgroup B cannot affect the granting of access right S. This is because the data from subgroup B is simply not used in interpreting this construct; thus, withholding data that will not be used cannot make any difference.

A second advantage of the present construct is that the broadest possible access is allowed for the principal being searched by the ACL. For example assume the groups and subgroups illustrated in FIG. 12. As may be seen, principal BOB is a member of both subgroups B and C. Under the traditional interpretation of A−B=>S, BOB would be denied access right S because he is a member of group B.

Under the method of interpretation of the present invention, however, BOB would be granted the access right because his membership in group A is not solely dependant on his membership is subgroup B. Thus in the present invention subtraction of one group does not affect other group memberships.

(d) Principal-set—C(name): Group EXCLUSION. The fourth construct allows for traditional subtraction. A−C(B) includes all of the members of A except those who are also members of B. In this construct B does not have to be a subgroup of A.

Generally, this construct should not be used where the reference monitor for an object does not have guaranteed access to the entire definition of a subtracted group. Such a case may occur where the subtracted group (B) includes subgroups that are not accessible by the reference monitor. If the reference monitor cannot expand the subtracted group through all its subgroups, there is a danger that improper access will be allowed. To avoid this situation, the reference monitor may deny access in all such situations.

9.3. Compound Principals in an ACL

The ACL may be used to restrict access to a user under certain circumstances.

(a) Limiting Access to Specified Computer Systems. In a distributed system, each system on the network may not be equally trusted. In these situations it may be desirable to limit a users access to certain system resources depending on which system he is operating from.

For example, one workstation may be highly secure, while another is relatively unprotected. In this example, it may be desirable to prevent a used from gaining access to highly sensitive resources through the unprotected workstation, but to allow the same user access when operating from the protected system. Thus, the access rights of the user depend on the system within which he is operating.

In order to implement this security policy, a new principal construct ON may be introduced. Thus, when a user U, makes a request through a workstation W, the workstation makes a request to a system resource (e.g., a server) as U ON W. This request is allowed by the user delegating to the workstation authority to make requests in the form of "U ON W says S". (Delegation is discussed in section 8, above). This request is interpreted as "W says U says S, and W is authorized to speak on U's behalf (evidenced by the delegation certificate)."

When such a request is made, the system resource's (object's) reference monitor checks the ACL for that system. If U ON W is found in the ACL, and the desired access S is allowed, then U, through W, is allowed access to the resource.

If delegation is cascaded through multiple systems, all the systems that are included in the compound principal and must appear in the ACL entry. For example, if U delegates to workstation W1, which delegates to workstation W2, which makes a request of a system resource, the ACL for that resource must allow the requested access for "U ON W1 ON W2." Because the degree of security for a chain is equivalent to the degree of security possessed by the least secure member, the order of delegation is usually not important. Thus, "U ON W1 ON W2" may be considered equivalent to "U ON W2 ON W1."

While single workstations were used in the above examples, any of the principals in the ACL may be groups. For example, an ACL having a principal-set entry of "U ON SECURE" would only allow access to user U if logged into any of the workstations in group SECURE. If this construct is used, and a user is to be allowed access to a system regardless of the delegated systems involved, the construct "U ON*" may be used. Such access right expressions may allow access to U regardless of the chain of delegation.

(b) Limiting Delegated Access Rights. In certain situations, a user with a high degree of trust may wish to use a computer system, but not to trust that system with all his capabilities. In other words, the user may wish to delegate to a system only a subset of his total access rights.

To allow the user to limit his delegated powers, it is convenient to introduce the concept of "roles." A role may be a certain group of access rights which the user (operating in that role) may exercise. For example, a user operating in the role of STUDENT may be allowed to read certain limited files. The same user, operating in the role of PROFESSOR, may be able not only to read these files, but to modify their contents as well.

When the user U delegates to a workstation W, he can sign a delegation certificate in the form of "W is authorized to speak for U AS R." In this manner, the workstation W will only be allowed to invoke the access rights that U has in role R. Any request from the workstation W to a system resource will be in the form of "(U AS R) ON W says . . . " To gain access to the system, the ACL for the requested resource must contain an entry granting the requested access to "(U AS R) ON W"; access should be denied if the workstation only includes "U" or "U ON W".

The ACL for a resource may be simplified if a group is defined to represent the role. If this is done the ACL entry may be expressed as "R ON W."The reference monitor for the resource will then verify that U is a member of R, and allow the requested access if R is listed on the ACL.

(c) Protected Subsystems. Several security systems utilize the notion of a "protected subsystem." A protected subsystem is a particular piece of software, sometimes in combination with a particular user. As discussed above, the degree of trust granted to computer systems in the network may vary. Thus, when considering a protected subsystem, the computer system executing the particular software is an important consideration, since correct execution depends on the trustworthiness of the computer and its operating system.

As discussed above, a workstation is authenticated by possession of a private key. When a protected subsystem Q is running on the workstation, the workstation W may authenticate itself, and assert request as "W AS Q."

When the workstation makes a request, it should do so as both the protected subsystem, and the user from whom the request is made. For example, if a user U runs a protected subsystem Q on a workstation W, and a request is made of the server, the request should be made in the form of (W AS Q) WITH U says . . . this request essentially indicates that "both U ON W AND W AS Q say . . . " This request will be granted if the ACL for the requested system has a listing for "(W AS Q) WITH U" and the reference monitor for the resource can:

(1) authenticate both U and W; and
(2) verify the certificate of delegation by U to W.

As discussed above in regards to roles, the ACL may be simplified to "Q WITH U" by defining a group Q consisting of all the systems which are authorized to run the particular protected subsystem. Thus "Q WITH U" is equivalent to "Q AND (U ON Q)."

9.4. Access Control Lists and The Group as an Object.

The group (used here to mean a simple or complex list of group member identities) may itself be treated as an object and as such has its own access controls (i.e., its own ACL). The group's ACL thus controls who may see the contents of the group and who may affect its membership.

Groups may be stored in any globally accessible storage device (i.e., a storage device available to all on the network). Generally, any storage device that supports groups should allow for the stored groups to be created, deleted, read, displayed, tested, and modified. Performance of the above listed operations should be limited to those principals having the necessary access rights (as indicated by the group's ACL).

The above described embodiments of the present invention are to be considered as illustrative, and not restrictive. For example, the functions described above may be equivalently implemented in hardware or software as convenient. It will be apparent to those of ordinary skill that many variations are possible without departing from the invention, which is set forth in the following claims.

What is claimed is:

1. In a distributed computer system, a method for delegating authorization from a user to a workstation for a computing session and of terminating the delegated authorization at the end of the computing session, the method comprising the steps of:
   (a) the user initiating a computing session by logging into the computer system through the workstation;
   (b) the workstation generating a public and private encryption key pair;
   (c) the workstation providing the public encryption key to the user;
   (d) the user certifying that the workstation possessing the private encryption key is authorized to speak on the user's behalf; and
   (e) the workstation erasing the private encryption key to terminate the the computing session.

2. The method of claim 1 wherein the public/private key pair is generated by the workstation prior to the user's login and step (b) comprises the step of selecting one of the pre-generated pairs.

3. The method of claim 1 wherein the private encryption key is erased at the time the user logs out of the computer system.

4. The method of claim 1 wherein the workstation demonstrates its rights to speak for the user by receiving a challenge from another workstation and signing the challenge with the private encryption key.

5. The method of claim 1 wherein the private encryption key is not erased if the workstation has not made any requests on the user's behalf.

6. A method for authorizing a second entity in a distributed computing system to speak for a first entity in the system, the method comprising the steps of:
   (a) the first entity issuing a nonce challenge to the second entity;
   (b) the second entity receiving the nonce challenge and generating in response a public and private encryption key pair;
   (c) the second entity issuing a response to the first entity, the response including the generated public encryption key; and (d) the first entity issuing a certificate indicating that any entity possessing the private key corresponding to the generated public key can speak on its behalf.

7. The method of claim 6 including a step after step (d) wherein the second entity speaks on behalf of the first entity by signing challenges from other entities with the generated private encryption key.

8. The method of claim 6 wherein the second entity is trusted to erase the generated private encryption key upon a request by the first entity.

9. The method of claim 6 wherein the second entity is trusted to erase the generated private encryption key upon a request by the first entity only when the second entity has made a request on behalf of the first entity.

10. The method of claim 6 wherein the first entity is a human user and the second entity is a workstation.

11. The method of claim 6 wherein both the first and the second entities are workstations.

12. A workstation in a distributed computing system comprising:

(a) means for receiving a nonce challenge from a first entity in the distributed system;

(b) means for generating a public and private encryption key pair in response to the received challenge;

(c) means for issuing a response to the first entity, the response including the generated public encryption key;

(d) means for erasing the generated private key in response to a request from the first entity.

13. The workstation of claim 12 wherein the first entity is a different workstation.

14. The workstation of claim 12 wherein the first entity is a human user.

15. The workstation of claim 12 further comprising:

means for receiving a request from the first entity for access to a second entity;

means for signing challenges issued by the second entity with the generated private encryption key; and means for forwarding the request from the first entity to the second entity.

* * * * *

UNITED STATES PATENT AND TRADEMARK OFFICE
CERTIFICATE OF CORRECTION

PATENT NO. : 5,224,163
DATED : June 29, 1993
INVENTOR(S) : Morrie Gasser, Andrew C. Goldstein, Charles W. Kaufman and Butler W. Lampson It is certified that error appears in the above-identified patent and that said Letters Patent is hereby corrected as shown below:

Col. 2, line 51: delete [ofter] and insert --often--.

Col. 4, line 23: delete [resources] and insert --resource's--.

Col. 9, line 42: After CA0 insert --certifies--.

Col. 17, line 56: delete [throught] and insert --thought--.

Signed and Sealed this

First Day of February, 1994

Attest:

BRUCE LEHMAN

*Attesting Officer*    *Commissioner of Patents and Trademarks*